United States Patent [19]

Meckling

[11] 4,004,167
[45] Jan. 18, 1977

[54] PERMANENT MAGNET STATORS

[75] Inventor: John H. Meckling, Altamonte Springs, Fla.

[73] Assignee: Magna Motors Corporation, Altamonte Springs, Fla.

[22] Filed: Jan. 29, 1975

[21] Appl. No.: 545,173

[52] U.S. Cl. .................. 310/154; 310/44; 310/254; 310/152; 335/302; 335/303

[51] Int. Cl.² ........................ H02K 21/06

[58] Field of Search .............. 310/43–45, 310/152–156, 254–259; 336/233; 335/303, 302

[56] References Cited

UNITED STATES PATENTS

| 1,976,230 | 10/1934 | Kato et al. | 335/302 X |
|---|---|---|---|
| 3,024,392 | 3/1962 | Baermann | 335/303 |
| 3,102,964 | 9/1963 | Bennett et al. | 310/154 |
| 3,248,676 | 4/1966 | Marley | 336/233 |
| 3,257,586 | 6/1966 | Steingroever | 335/303 |
| 3,872,334 | 3/1975 | Loubier | 310/44 X |

*Primary Examiner*—Donovan F. Duggan
*Attorney, Agent, or Firm*—Roger L. Martin

[57] ABSTRACT

Annular magnets, primarily for motor stators, are centrifugally cast from particulate materials and synthetic plastic materials. Iron particles and ferrite particles stratified during the spin casting procedures so that the former provide an outer stratum that serves as a yoke in the permanently magnetized structure. The anisotropic ferrite particles are magnetically oriented during casting by a rotating center magnet with the aid of bucking magnets that also rotate and serve to confine the field of the center magnet to the cavity area. Apparatus for carrying out the process is disclosed and includes means for introducing the plastic and particulate materials to the mold cavity while the mold is rotating as well as mold arrangements that facilitate material introduction by the creation of reduced pressure conditions in the cavity during the rotation of the mold. Permanent magnets or electromagnets may be used for ferrite particle orientation and compound magnets made from laminated and facially polarized rubber magnetic sections and which are arcuately bent are disclosed.

6 Claims, 19 Drawing Figures

Fig. 1

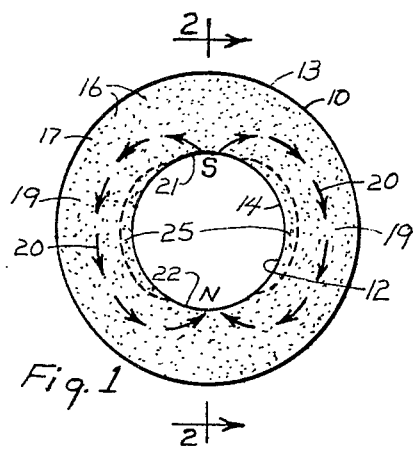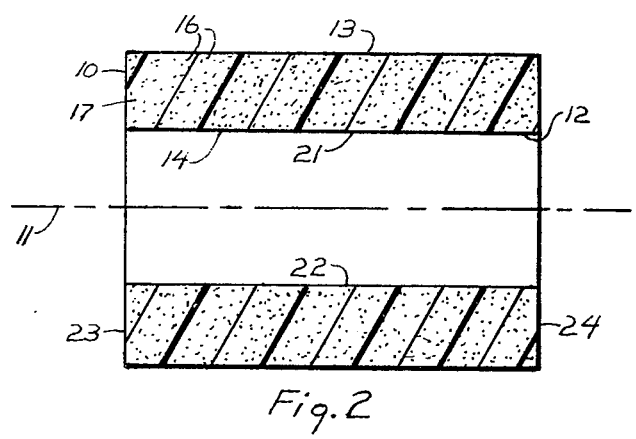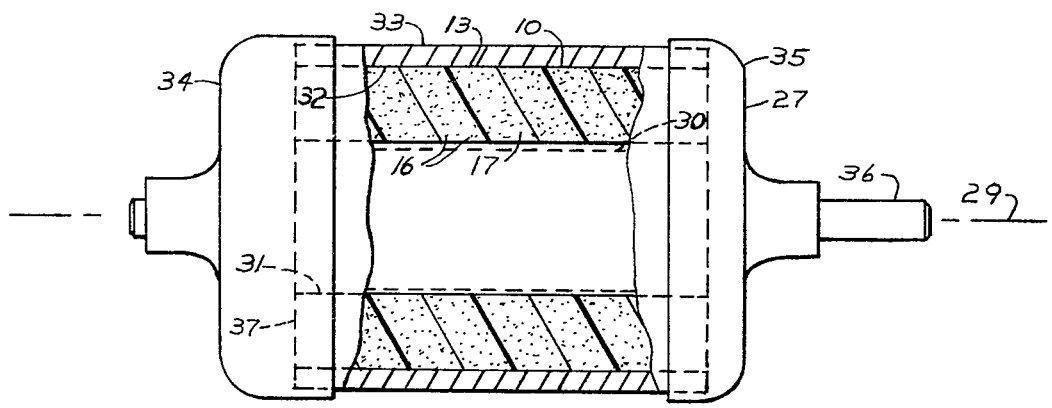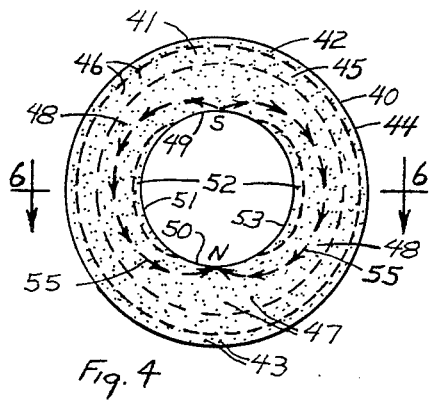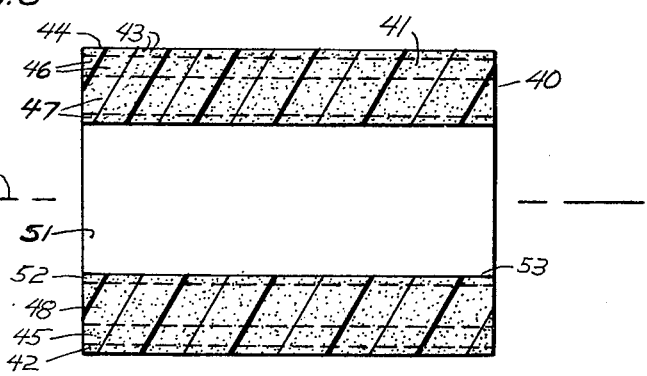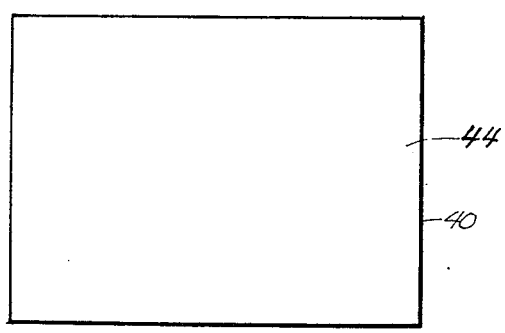

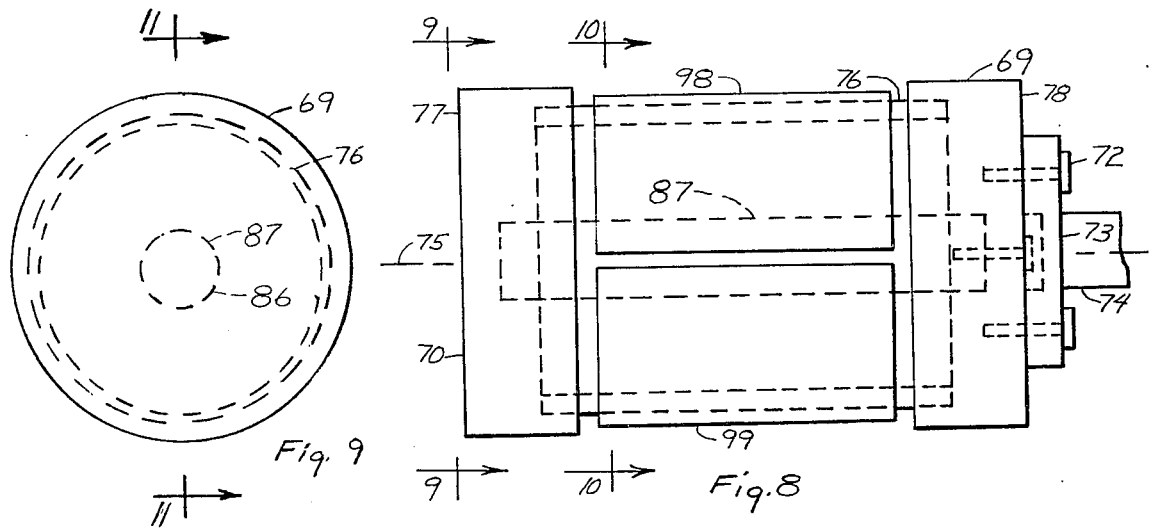
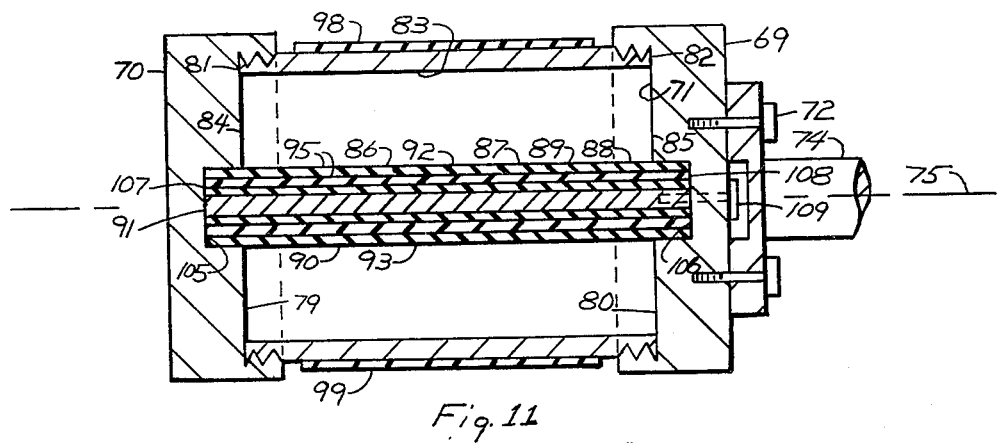
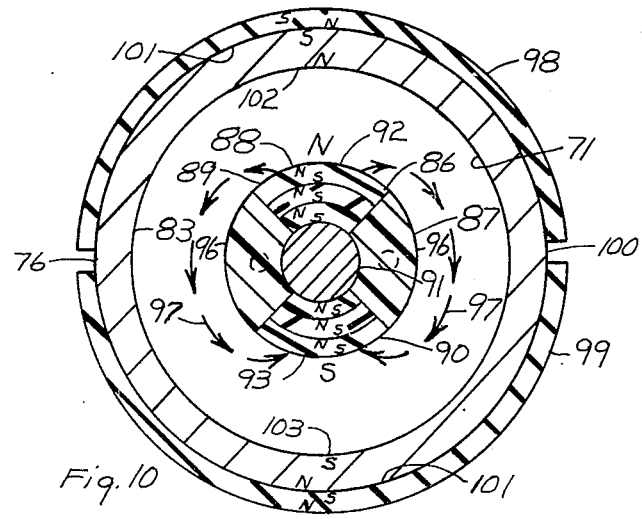

PERMANENT MAGNET STATORS

BACKGROUND OF THE INVENTION

The invention relates to permanently magnetized annular structures useful primarily for stators in dynamo electric machines, and more particularly to stators that are molded from synthetic plastic materials which serve as a matrix for embedded particles of magnetically anisotropic ferrite materials that have been magnetically oriented during the molding of the plastic material. The stator structures contemplated by the invention are preferably molded by centrifugal casting procedures, and the invention further relates to methods of manufacturing such stators and to certain devices that are useful in carrying out the centrifugal casting procedures.

The use of particulate anisotropic ferrite materials in the manufacture of permanently magnetized structures is well advanced in the art. Such materials have a hexagonal crystal structure and exhibit the phenomena when subjected to a highly intense magnetic field of retaining a higher magnetic charge in one direction in the crystal structure than in others. The anisotropic ferrite materials have the advantage over many of the metal and metal alloy types of permanent magnets, such as those made from alnico, in that they exhibit a higher coercive force and hence are especially suitable for many applications where vibrations and other demagnetizing phenomena make it unsuitable to use the cast metal magnetic structures.

One of the problems which has confronted the industrial use of the anisotropic ferrite materials resides in the attainment of high density ferrite structures that provide a high remanence in the finished magnet. One of the approaches which has been taken to overcome this problem in the manufacture of permanently magnetized ferrite stators used in motors and other dynamo electric machines has been to mold the particulate ferrite materials under high pressures and to thereafter sinter the molded structures so as to attain the structural stability needed for the contemplated application. Such procedures usually provide for a suitable magnetic orientation of the particles during the molding procedures and the subsequent subjection of the sintered product to an intense magnetizing field along the path of orientation to develop the desired remanence in the cast structure. The sintering procedures have several disadvantages, among which may be mentioned the fact that the resulting structures are brittle, are frequently warped as a result of the sintering process and thereby unsuitable for the intended application, and frequently provide a magnetic field with a nonuniform flux density.

Attempts have also been made to manufacture annular magnetic structures from the anisotropic materials by procedures which avoid the sintering steps. Such attempts have involved the casting in an appropriately shaped mold of a suitable plastic material containing a suspension of the anisotropic ferrite particulate materials. During such procedures, and while the plastic material is fluid or in a semi-fluid state, the ferrite particles are magnetically oriented in accord with the desired polar arrangement in the stator structure. Such procedures, although being useful, suffer from the difficulties associated with the attainment of high particle densities and thus the high remanence values in the cast stator products. Experience has shown that the high viscosities which are encountered in handling a deformable mass of synthetic material containing high concentrations (e.g. greater than 80%) of the particulate anisotropic ferrite materials still require high mechanical pressures to be exerted during the casting procedures in order for the materials to take the shape of the mold or die, and that the high viscosities also tend to deter mobility of the particles as they are magnetically oriented during the casting procedures.

BRIEF SUMMARY OF THE INVENTION

The inventor has found that by using centrifugal casting procedures in the molding of stator structures from deformable mixtures of hardenable plastic materials and the ferrite particles that the superior remanence values associated with the sintered products are attained in the finished stator structures and, among other things, that deformable mixtures with relatively lower particle densities can be subjected to the casting procedures to attain the high remanence values in the finished magnetic products. This may be attributed to the compacting of the particulate material in the plastic matrix under the centrifugal forces involved in the casting procedures.

The centrifugal casting procedures involved also lend themselves to the incorporation of fibrous reinforcing material in the cast structure and which heretofore by the more conventional molding procedures have detracted from the attainable particulate loading of the ferrite material in the castable masses. The procedures further lend themselves to the attainment of a one piece cast stator structure that has a high density peripheral stratum of ferromagnetic particulate material and which serves as a yoke in the permanently magnetized stator structures. This stratum surrounds the inner stratum containing the particles of magnetically anisotropic material which is oriented to provide the flux producing structure for the permanent magnet. The procedures also facilitate the attainment of stator structures which cosmetically are more appealing in certain applications, the procedures making it possible to provide a thin peripheral stratum of more acceptable appearing nonmagnetic particulate materials.

In accord with certain aspects of the invention, the magnetically attractable anisotropic ferrite particles are oriented in the plastic matrix during the centrifugal casting procedure by means of a magnet which is centrally located along the spin axis of the mold and which is so shaped and arranged to provide the desired pole faces in the cast structure. In accord with the preferred procedures, the return flux path for this magnet is oriented during the casting procedure so as to provide a high flux concentration which traverses the mold area in which the anisotropic ferrite particles are housed. This is accomplished by what may be termed as a "bucking" magnetic structural arrangement that rotates about the spin axis at the perimeter of the mold and in an arrangement such that each pole of the centrally located magnetic structure is facially confronted at the perimeter of the mold by a like magnetic pole that serves to orient and confine the flux path primarily to the cavity area of the mold. These particle orienting and bucking magnets may be permanent magnets or electromagnets as will be subsequently seen.

Various procedures may be employed in centrifugally casting the stator structures. In accord with certain aspects of the invention a process and apparatus is provided which permits each component of the centrifugal cast structure to be separately introduced into the cavity of the mold during the casting procedure. This method and apparatus has the advantage, as will be subsequently seen, of avoiding the handling of highly loaded and viscous mixtures while, nevertheless, permitting the attainment of maximum particulate loading in the desired regions of the stator structure. The centrifugally casting procedures also lend themselves to the use of liquid synthetic resinous materials which are chemically catalyzeable to form the hardened matrix material as well as to the use of thermoplastic and thermosetting synthetic materials.

A general object of the invention is to provide improved permanent magnet structures of the annular type that may be used as stator components in dynamo electric machines. Yet another object of the invention is to provide improved procedures and apparatus for use in manufacturing annular stator structures from particulate anisotropic ferrite materials and hardenable resinous materials and which permit the attainment of the high density concentrations heretofore associated with sintered products. Yet another object is to provide methods and apparatuses for orienting and attaining high concentrations of anisotropic ferrite particles in plastic structures and without the need for preparing highly thixotropic mixtures that require high molding pressures in order to adequately mold such materials. Yet another object is to provide methods and apparatuses for manufacturing one piece permanently magnetized stators for dynamo electric machines. A further object of the invention is to provide methods and apparatuses for producing stator structures that avoid the need for sintering procedures but which are nevertheless capable of attaining comparable ferrite particulate densities in the finished products. Other objects will be apparent from the following description and disclosure.

BRIEF DESCRIPTION OF THE DRAWINGS

FIG. 1 is an end elevational view of an annular permanently magnetized structure embodying certain principles of the invention;

FIG. 2 is a longitudinal section view along the axis of the permanent magnet seen in FIG. 1 and as taken along the lines 2—2 thereof;

FIG. 3 is a side elevational view with certain parts broken away and others shown in broken lines of a two pole electric motor utilizing the annular permanent magnets seen in FIGS. 1 and 2;

FIG. 4 is an end elevational view of a one piece annular stator structure embodying the principles of the invention;

FIG. 5 is a top plan view of the structure seen in FIG. 4;

FIG. 6 is a sectional view along the lines 6—6 of FIG. 4;

FIG. 8 is a side elevational view of a mold and associated apparatus that may be used in centrifugally casting the stator structures illustrated in the previously mentioned figures, certain parts being broken away;

FIG. 9 is an end elevational view taken along the lines 9—9 of FIG. 8;

FIG. 10 is a transverse sectional view through the mold and its cavity area as seen along the lines 10—10 therein;

FIG. 11 is a sectional view along the axis of the mold and as seen along the lines 11—11 of FIG. 9;

DETAILED DESCRIPTION OF INVENTION

Figure 7:
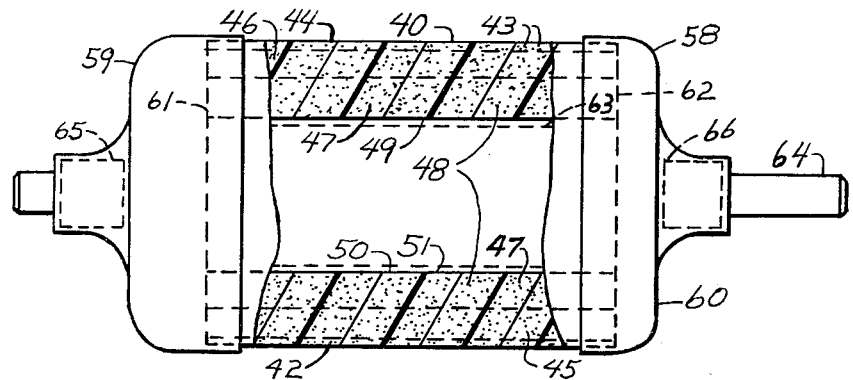
FIG. 7 is a side elevational view with certain parts in section and others broken away or shown in broken lines of a two pole permanent magnet motor utilizing the stator structure shown in FIGS. 4–6.

The permanent magnets contemplated by the invention have a matrix of hardened synthetic plastic material which contains dispersed particles of one or more magnetically anisotropic and magnetically attractable ferrite materials which are magnetically oriented in the hardened matrix as the plastic material is caused to harden during the casting procedure. In a preferred embodiment, the annular permanent magnet has an annular stratum of particulate, highly permeable ferromagnetic material which is located at the outer peripheral surface of the annular member and surrounds an inner stratum of magnetically oriented anisotropic ferrite particles.

The magnetically attractable ferrite materials which have been found useful in the practice of the invention have a hexagonal crystal structure and are magnetically anisotropic in that they have a preferential direction in which they retain a maximum magnetizing force when subjected to a magnetic field. As such, in particulate form, such materials tend to orient themselves so that the preferential direction is aligned with the flux path of the magnetizing field. Such "ferrite" materials are well known in the art and may be exemplified by the barium ferrite, copper ferrites, chromium ferrites, nickel ferrites, cobalt ferrites, stronsium ferrites as well as the lead ferrites, magnetites, franklinites, hematites to name but a few. Such materials may be used alone or in various combinations to tailor the B and H factors. Such materials are known to exhibit magnetic anisotropic properties in single domain particle sizes, and particles of such materials may be used in particle sizes ranging from about 3 to 10 microns.

The ferromagnetic materials of high permeability that are useful when incorporated in particulate form in the stator structures are also well known in the art. Such materials are magnetically isotropic and include soft iron as well as numerous ferroalloys well known in the art.

Apart from the particles of "ferrite" and "ferromagnetic" materials that may be used in casting the stator structures, various particulate forms of nonmagnetic materials may be utilized to provide surface colorations and surface appearances which are more aesthetically acceptable in certain applications for the stators. For example, particulate aluminum and other nonmagnetic metal and metal alloys may be used in particulate form as well as the pigments commonly used as fillers and colorants in plastic and paint formulations, such as $Ca Co_3$, $Ti O_2$, lamp black, etc.

Various different types of synthetic plastic materials may be used in the centrifugal casting procedures advocated herein. The principal limitation on such materials is that they must be sufficiently fluid or capable of being rendered sufficiently fluid to provide a mass with the incorporated particulate material that is sufficiently deformable under the centrifugal forces involved to take the form of the mold and simultaneously permit migration of the particles under the magnetic and centrifugal forces encountered in the procedures. The invention contemplates the use of liquid thermosetting synthetic resinous materials which are hardened by the application of heat during the centrifugal casting procedures, solid commutated thermoplastics synthetic resinous materials which are rendered sufficiently fluid during the centrifugal casting procedures by the application of elevated temperatures to the materials and thereafter cooled to effectuate hardening, as well as the liquid polymerizable synthetic materials which are hardened during the centrifugal casting procedures by the incorporation of chemical catalyzing agents that serve to effectuate completion of the polymerizations and hence hardening of the liquid materials. Among the thermosetting synthetic resinous materials which may be employed may be mentioned the urea-formaldehydes, phenol formaldehydes, melamine formaldehydes, as well as the cross linking polyesters and alkyds among others.

Among the thermoplastic synthetic resinous materials which may be employed may be mentioned the chain linked vinyls, acrylics, polyurethanes, cellulose acetates, polyesters, polycarbonates and epoxies among others.

Typical liquid synthetic resinous materials which are commonly hardened by chemical catalyzing agents are of course the solvent soluble or dispersable monomeric and polymeric materials such as the alkyls, aminos, epoxies, furans, polybutadienes, polyesters among others. Such materials are commonly hardened by the well known peroxide chemical catalyzing agents such as alkyl peroxide, the ketone peroxides and others well known in the art.

Reference is now made to the annular magnetic structure shown in FIGS. 1 and 2 and which shows an embodiment of certain principles of the invention in its simplest form. In this instance the magnet is shown in the form of a one piece annular member 10 which has an axis 11 of symmetry that extends through the hollow 12 of the toroidal member. The hollow in this instance is adapted for reception of a rotatable member of a dynamoelectric machine such as a motor armature. Member 10 has a cylindrical outer peripheral surface 13 and a cylindrical inner peripheral surface 14. These surfaces 13 and 14 are offset from the axis 11 and are radially spaced apart as is evident from FIG. 1.

The centrifugally cast member 10 is composed of dispersed particles 16 of a suitable magnetically anisotropic material such as one of the barium ferrite materials and the particles are embedded in a matrix 17 of hardened synthetic plastic material such as a chemically hardened polyester resinous material.

As will be subsequently seen, during the centrifugal casting procedure the magnetically attractable anisotropic particles were subjected to both magnetic and centrifugal forces. These forces served to concentrate and compact the anisotropic particles into a pair of strata or regions 19 of generally arcuate shape and wherein the particles are substantially uniformly concentrated in the matrix material. The magnetic forces were applied between diametrically oppositely located and oppositely polarized pole faces located in the hollow 12 during the casting procedure. This served to magnetically align the particles in the regions 19 generally along the paths indicated by arrows 20 in FIG. 1 and to simultaneously establish arcuate pole faces 21 and 22 of opposite polarity at diametrically opposite sides of the inner peripheral surface 14 of the annular member 10. These pole faces 21 and 22 extend between the opposite ends 23 and 24 of member 10 and due to the magnetic attraction for the particles which is exerted by the particle polarizing magnet during the casting procedure, the regions of substantially uniform particle concentration are substantially continuous between the pole faces 21 and 22 in the annular structure but are offset radially from the inner peripheral surface 14 between the circumferentially spaced pole faces. This results in diametrically oppositely located arcuate regions 25 in the matrix material and wherein the particulate concentration of the anisotropic material is less than that in the surrounding stratums 19 of substantially uniform particulate concentration. It is believed that during the centrifugal casting procedure the particles in the regions 25 tend to move radially outwardly of the axis 11 under the centrifugal forces acting on the particles and that the resulting compactness in the peripheral stratum 19 adjacent these regions 25 causes circumferential particle movement toward the pole faces 21 and 22 while the matrix material remains deformable so that the particles are compacted at the pole faces 21 and 22 by a combination of magnetically attracting forces exerted at such faces and centrifugal forces which act upon the particles in the circumferential space therebetween.

The particles retain a certain amount of residual magnetism as a consequence of the magnetic orientation involved during the hardening of the matrix and they may be further magnetized to saturation in a suitable magnetizing fixture which will be subsequently seen.

FIG. 3 illustrates the use of the annular magnet 10 as a component of the stator 33 for a two pole DC motor 27. As seen therein, the annular magnet 10 is housed in the hollow 31 of an annular member 28 made from a suitable highly permeable ferromagnetic material such as soft iron and in a coaxial arrangement which is common to the axis 29 for rotation of the armature component 30 of the motor. The annular member 28 in this instance serves as a flux transmitting yoke for the annular magnet 10 and is so arranged in the assembly that its cylindrical inner peripheral surface 32 is contiguous with the cylindrical outer peripheral surface 13 of the toroidal permanently magnetized component of the stator 33. Motor 27 has a pair of end bells 34 and 35 which are suitably secured at the opposite ends of the stator 33 structure and which house bearings in which the shaft 36 is journaled for rotation about axis 29. The commutator and brush assembly (not shown) are of conventional design and are housed adjacent the end 37 of stator 33 in the end bell designated at 34.

FIGS. 4 through 6 illustrate a one piece annular structure cast by centrifugal casting procedures advocated herein and wherein the field collapsing yoke is formed from particles of highly permeable ferromagnetic material which are embedded in the matrix together with the anisotropic ferrite particles prior to the hardening of the matrix material. The stator 40 in this instance comprises a matrix 41 of hardened plastic material which has a thin, generally cylindrical stratum 42 composed of particles 43 of nonmagnetic material such as calcium carbonate. This stratum 42 is located contiguous to and at the cylindrical outer peripheral surface 44 of the annular component 40. Radially inwardly of this stratum 42 is yet another annular stratum 45 of particulate material. This stratum 45 is composed primarily of ferromagnetic particles 46 which are embedded in the matrix and which serve the function of a yoke in the permanently magnetized stator structure 40. Radially inwardly of the yoke forming stratum 45, the plastic material serves as a matrix in which the ferrite particles 47 are embedded. These particles 47 have been subjected to both magnetic and centrifugal forces during the casting procedure in a manner similar to those described in the consideration of the magnetic structure shown in FIGS. 1, 2 and 3. Consequently, the structure 40 has generally arcuate high density regions or strata 48 of substantially uniform particulate concentration. These regions 48 are contiguous to the yoke forming cylindrical stratum 45 and as in the previous embodiment extend between the opposite pole faces 49 and 50 that are formed along the cylindrical inner peripheral surface 51 of the structure during the casting procedure. Again like the previously described magnetic structure, the structure shown in FIGS. 4, 5 and 6 has arcuate regions 52 between the circumferentially spaced pole faces 49 and 50 in which the concentration of the ferrite particles is less than that in the high density regions 48.

In the formation of the toroidal stator structure 40 by the centrifugal casting procedure the particles 47 of anisotropic ferrite material are magnetically oriented by means of a two pole magnet that is located in the hollow 53 of the stator 40 and rotates about the axis 54 of symmetry for the structure as the various particles are fixed in the various regions during the hardening of the matrix material. This aligns the polar axes of the ferrite particles with the exterior flux path from the magnet as generally indicated by the arrows 55 in FIG. 4. The particles are thereafter saturated in appropriate magnetizing fixtures to provide a permanently magnetized annular stator component 40, as will be subsequently seen.

The stator shown in FIGS. 4, 5 and 6 has the advantage that the yoke forming and magnetized components are all embodied in a one piece molded stator structure that has an aesthetically appealing surface appearance due to the peripheral stratum and which can be simply assembled for use as the stator component of a motor such as shown in FIG. 7. In FIG. 7 the annular stator 40 is seen as a component of a two pole DC motor 58. The motor 58 has opposite end bells 59 and 60 which are press fit onto the outer peripheral surface 44 at the opposite ends 61 and 62 of the hollow annular member 40. The armature 63, shown in broken lines, is coaxially arranged in the hollow 53 of the stator 44 and is mounted on the drive shaft 64 of the motor. This shaft 64 is journaled at its opposite ends in suitable bearings 65 and 66 mounted within the end bells in a conventional manner. The commutator and brushes (not shown) are again of conventional design and are mounted internally in end bell 59.

Reference is now made to FIGS. 8–11 and wherein a casting apparatus 69 for use in centrifugally casting annular magnetic structures is shown as including a generally cylindrical, hollow mold 70 that has a toroidal or annular cavity area 71 in which the annular magnets may be centrifugally cast by procedures which will be subsequently described. The mold 70 is connected by machine screws 72 to the end flange 73 of a driven shaft 74 that is coaxially aligned with the axis of rotation for the mold 70 and serves as a means for rotating the mold 70 about its longitudinal axis 75.

The mold 70 includes a hollow annular member 76 made from suitable ferromagnetic material, such as iron, for reasons which will be subsequently explained. It also includes a pair of circular disk-type end caps 77 and 78 which are provided with recessed facial surfaces 79 and 80 to facilitate a threaded connection with the annular member 76 at its opposite ends 81 and 82. The cylindrical inner wall 83 of member 76 defines the outer perimeter of the cavity area 71, and the recessed surfaces 79 and 80 of the end caps form the perimeters at the opposite ends 84 and 85 of the cavity area. The end caps, in this instance, are made from aluminum or other suitable metal or alloy having a low permeability for reasons which will be subsequently explained.

Along the axis 75 of rotation for the mold 70, the mold is equipped with an elongated solid cylindrical core structure 87. This core 87 is surrounded by the cavity area and has an axis which is common to that of the annular member 78. The outer cylindrical surface 86 of the center core defines the inner cylindrical perimeter of the annular cavity. The core structure 87 has a permanently magnetized component 88 which serves to orient the particles of anisotropic material which are incorporated in the cavity area during the casting procedure. This component 88 comprises a pair of compound permanent magnets 89 and 90 that are fixed at diametrically opposite sides of an elongated, coaxially arranged, cylindrical iron core piece 91 in a manner such as to provide a pair of circumferentially spaced arcuate pole faces 92 and 93 for the magnetic core component 88.

The compound magnets 89 and 90 in the illustrated embodiment are circumferentially spaced apart in the core component. Each compound magnet is made up of a plurality of elongated, thin, flat, facially polarized, flexible magnetic sections 95 that are flexed to an arcuate contour in the laminated structure and suitably secured together in face-to-face confronting arrangement where the poles of each section are arranged in a pole complementing arrangement that is apparent from FIG. 11. This provides the opposite pole faces 92 and 93 at the diametrically opposite sides of the cylindrical core structure. As seen in FIG. 10, the compound magnets 90 and 89 and the iron core piece 91 are encased at their opposite sides between hardened plastic material 96 that may be suitably reinforced for example with glass fibrous material.

The arcuate width dimension of each magnet section 95 in the laminated arrangement for each compound magnet progressively diminishes radially inwardly from the outer cylindrical surface 86 of the cylindrical core component 87. The iron core piece 91 serves to magnetically couple the compound magnets 89 and 90 and the diminishing section width arrangement in each compound magnet serves to suppress short circuiting flux paths to the laminates of the structure and facilitates the establishment of an overall flux path external of the center core 87 which is through the cavity area and generally indicated by arrows 97.

The external flux path for the magnetized component 88 of core 87 is generally confined to the cavity area by a pair of thin, flat, flexible and facially polarized bucking magnets 98 and 99. These magnets are suitably secured to the outer periphery 100 of the annular mold member 76 and are radially outwardly offset from the pole faces 92 and 93 of the center core 87. The arrangement of the compound magnets 89 and 90 in the center core provide magnetic poles of opposite polarity at faces 92 and 93 as seen in FIG. 10. Each of the "bucking" magnets 98 and 99 is arranged so that its axially facing polarized facial surface 101 faces a pole face of like polarity in the core structure. This provides an induced like polarized face at the inner wall of the annular member 76 such as indicated at 102 and 103 and which serve to confine the flux field from the core component 88 generally to the cavity area. The end caps 77 and 78 in this respect, are made of low permeable material to prevent short circuiting flux paths, as will be well evident to those skilled in the art.

The end caps 77 and 78 are provided with aligned cylindrical recesses 105 and 106 and the opposite ends 107 and 108 of the center core structure fit in these recesses in the assembled mold. In this respect, the center core 87 is fixed to cap 78 by means of a pair of aluminum machine screws 109 that threadingly engage the core end 108 at the opposite sides of the compound magnets. The other end 107 of the center core 87 snuggly fits in the recess in cap 77 so as to facilitate ready assembly and disassembly of the mold structure and the incorporation of the moldable materials and removable of the cast product from this end of the mold.

In the process of preparing an annular magnet from particulate ferrite material in accord with the invention, it is preferable to initially magnetically sensitize the "ferrite" particles in a suitable magnetic field. This is done so that each particle of the ferrite material develops opposite magnetic poles and hence is responsive to the orienting magnetic field during the centrifugal casting procedure. In this respect, the ferrite particles to be used in the casting procedure are preferably stirred prior to wetting with the matrix forming material in a suitable magnetic field and for such a period of time as is necessary to magnetically sensitize substantially all of the particles. This "presensitizing" may be accomplished by simply stirring the particles in the presence of the matrix forming material and during the formation of the initial mixture which is to be introduced to the mold. However, experience has shown that this "presensitizing" procedure is more rapidly and effectively accomplished when the particles are stirred in the magnetic field while still in a dry or unwetted state.

The apparatus shown in FIGS. 8-11 may be used for casting either of the annular magnetic structures seen in FIGS. 1-7 and through the use of a matrix forming liquid polymerizable synthetic material which is polymerized and hardened during rotation of the mold 70 by admixture with a chemical catalyzing agent.

In carrying out a centrifugal casting procedure using the apparatus shown in FIGS. 8-11, a deformable mass which constitutes a basic mixture of the materials is initially prepared for introduction to and confinement in the cavity area 71 of the mold. The basic mix may comprise an intimate mixture of the magnetically sensitized ferrite particles and the liquid polymerizable synthetic material together with a suitable catalyzing agent for effectuating the polymerization of the synthetic material to a hardened state during the centrifuging procedure. In general, the ferrite particles constitute at least seventy percent by weight of the basic mixture, and this mixture may be formed by simply stirring the solid ferrite particles with the polymerizable material and catalyzing agent to provide a suitable dispersion of the solid particles in the liquid materials involved. In the preferred stator arrangement, an integrally cast yoke forming stratum in the molded structure is desired. In such cases, the ferromagnetic particles which are used to form this stratum may be also mixed together with a ferrite particulate material and other components during the initial preparation of the basic mix. The amount of ferromagnetic material used in forming the basic mixture may vary depending upon the intensity of the external field which is to be collapsed by the yoke forming portion of the molded stator, as those skilled in the art will be aware. In general, the presence of the ferromagnetic particulate material in the basic mix in a weight ratio of about one part ferromagnetic material to about five parts anisotropic ferrite material has been found satisfactory. However, lesser or greater amounts of the ferromagnetic material may, of course, be employed.

Following the preparation of the basic mixture, and prior to any appreciable polymerization that would interfere with the mobility of the particles under the contemplated conditions for centrifugally casting the structure, an amount of the basic mixture sufficient to fill the cavity area of the mold is introduced to the mold by removing and thereafter replacing the end caps 77. As soon as this has been done, the mold is then rotatably driven about its longitudinal axis 75. Experience has shown that when the basic mixture contains dispersed particles of both ferromagnetic and anisotropic ferrite materials in an intimate mixture that the best stratification is accomplished by progressively increasing the rotational speed to a maximum rpm. This maximum revolutions per minute may be determined empirically as being one which is just less than that at which the ferrite particles in front of the pole faces 92 and 93 of the center core 87 move radially outwardly from the pole faces for reasons of centrifugal forces which exceed the magnetic attracting forces exerted on the particles at the pole faces.

Throughout the centrifugal casting procedure, the ferrite particles are subjected to the rotating and particle orienting magnetic field produced by the coaction of the core magnet 88 and the blocking magnets 98 and 99. This field serves to magnetically align the ferrite particles generally in accord with the flux path indicated by arrows 97. One may also stimulate movement of the particles prior to the hardening of the matrix material by subjecting the rotating mold to mechanical vibrations or by agitating the particles during the casting procedures through the use of ultrasonic means (not shown). Needless to say, rotation of the mold is maintained until such time as the matrix forming material hardens sufficiently to maintain its structural stability contemplated by the process. Through use of the centrifugal casting procedure, effectively high density regions of particulate ferrite material may be obtained and which are comparable to those obtained in sintered magnets made from such materials.

Figure 12:
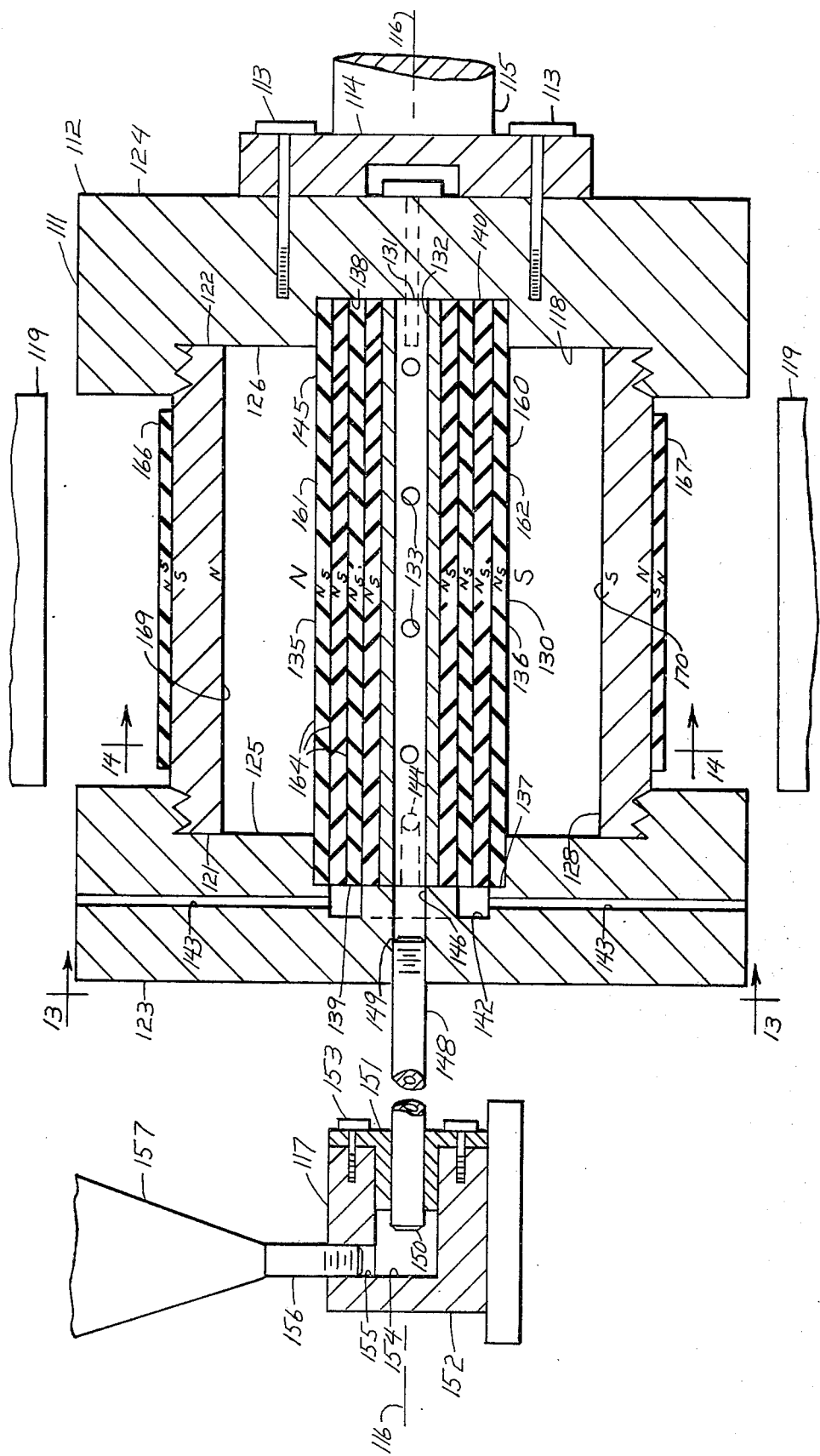
FIG. 12 is a sectional view along the plane common to the axis of rotation of yet another mold structure and associated apparatus which may be used in centrifugally casting the stator structures, the view also showing a mechanism for feeding the components of the contemplated stator to the mold with certain parts being broken away and others illustrated in broken lines.
Figure 13:
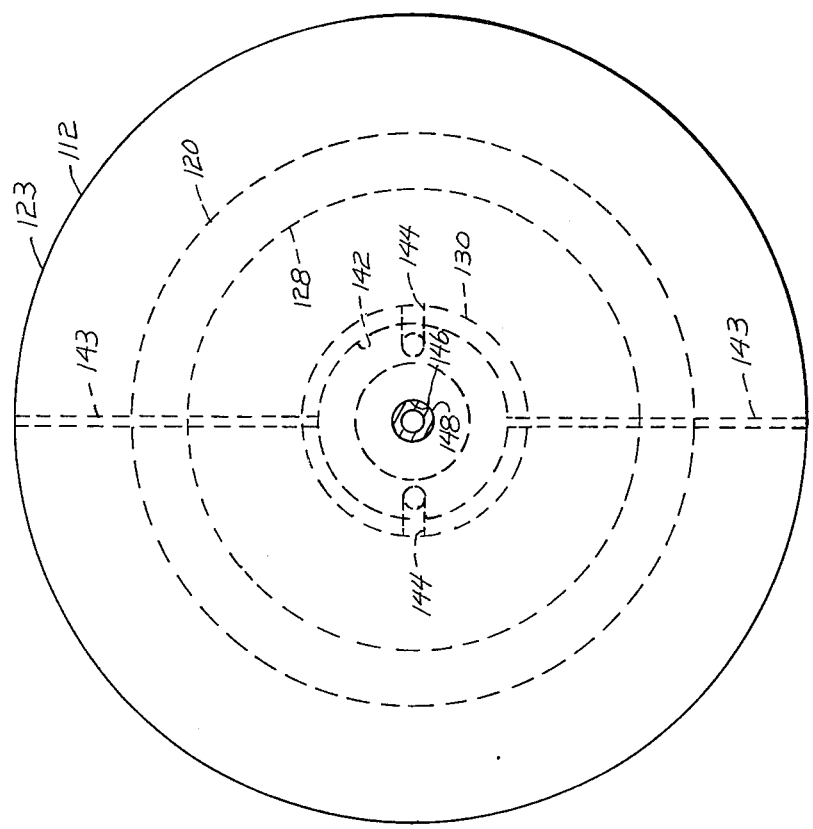
FIG. 13 is an end elevational view of the mold as seen along the lines 13—13 of FIG. 12.
Figure 14:
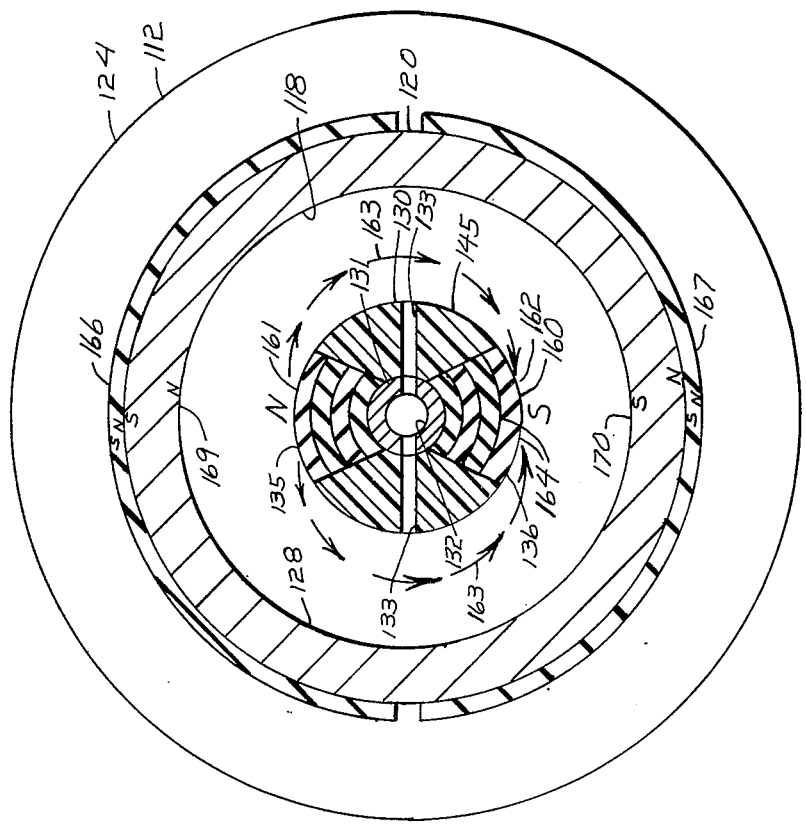
FIG. 14 is a sectional view taken transverse to the axis of rotation of the mold seen in FIG. 12, and as taken along the lines 14—14 therein.

Reference is now made to FIGS. 12–14 and wherein another apparatus 111 for use in centrifugally casting the annular magnetic structures is shown. In this instance the apparatus 111 includes a generally cylindrical mold 112 which is fastened by means of machine screws 113 to the end flange 114 of a driven shaft 115. This shaft serves as a means for rotating the mold about its longitudinal axis 116 as in the previous embodiment. The apparatus also includes a feed mechanism 117 which, in this instance, is used for delivering the materials that enter into the makeup of the cast component to the annular cavity 118 area of the mold during the casting procedure. The apparatus 111 is further equipped with radiant heaters 119. These heaters 119 permit the use of thermoplastic polymeric materials or alternatively thermosetting polymeric materials for forming the matrix of the particle laden magnets casted in the mold.

The mold 112 includes a hollow, annular member 120 which is opened at its opposite ends 121 and 122 but which are closed in the assembled mold arrangement by a pair of circular disk-type end caps 123 and 124. These caps have recessed inner facial surfaces 125 and 126, as seen in FIG. 12, and are threadingly secured to the annular shell member 120 at its opposite ends. Like the previously described molding apparatus, the annular member 120 is made of ferromagnetic material, such as iron, and the end caps are made of aluminum or some other material of low magnetic permeability. The inner cylindrical surface 128 of member 120 defines the outer perimeter of the cavity area 118 while the recessed surfaces 125 and 126 define the opposite ends of the cavity.

The center core component 130 is similar to that described in the previous embodiment, except that the center pole piece 131 in this instance is tubular so as to form a receiving chamber 132 for the materials that are to be dispensed to the cavity area 118 during the casting procedure. The core component 130 also differs in that it has a plurality of radially extending and axially spaced apart passageways 133 which interconnect the cavity area 118 and the chamber 132 through the hardened plastic area at the sides of the compound magnets 135 and 136.

The recessed surfaces 125 and 126 in the end caps 123 and 124 are provided with axially aligned recesses 137 and 138 to accommodate the opposite ends 139 and 140 of the cylindrical core component in a manner similar to that previously described. Thus the magnetic core is secured to cap 124 by means of metal-type screw fasteners 141 while at the other end the center core snuggly fits in the center recess 137. Cap 123 has an annular inner recess 142 which confronts the adjacent end 139 of the core component 130 of the mold. This recess 142 is coaxially arranged with respect to the longitudinal axis 116 of the assembled mold. The cap 123 also has a plurality of radially extending passageways 143 which communicate with the annular recess 142. As best seen in FIGS. 12 and 13, this end 139 of the core component 130 is provided with a pair of passageways 144 that in the assembled mold interconnect the annular recess 142 and the cavity area 118 at the cavity confronting outer cylindrical surface 145 of the cylindrical core component 130. This arrangement, as will be subsequently seen, provides a means for expelling air from the cavity area 118 during the introduction of the material to the mold and also has a means for conducting excess material out of the cavity area 118.

End cap 123 has a bore 146 which communicates with the chamber 132 formed by the tubular core piece 131. This bore 146 is axially aligned with the axis of rotation of the mold. In the embodiment illustrated, an elongated tubular conduit 148 that rotates with the mold is threaded at one end 149 in the bore and is journaled at its opposite end 150 in a bushing 151. This bushing is fixed to a block 152 by metal fasteners 153. Block 152 has a bore 154 which is axially aligned with the axis of rotation of the mold and in which the bushing is mounted as seen in FIG. 12. This block 152 also has a vertically extending bore 155 which communicates with bore 154 and in which it receives the threaded end of a conduit 156 of the feed mechanism 117. At its opposite end, this conduit 156 is connected to the discharge opening of a hopper 157 for receiving the materials that are fed to the mold cavity by way of the tube component 148 of the feed mechanism 117.

The permanently magnetized component 160 of the center core 130 is provided by the compound magnets 135 and 136. These magnets are so arranged as to provide diametrically oppositely facing arcuate pole faces 161 and 162 and which are of opposite polarity as in the previously described embodiment. Each compound magnet is composed of thin, flat, resilient, flexible magnetic sections 164 which are arranged in a face-to-face relation and in a complementing pole arrangement so as to provide an external flux path in the cavity area which is generally indicated by the arrows 163. The flexible sections 164 again have arcuate width dimensions in the laminated compound magnetic structures which progressively diminish radially inwardly from the peripheral surface 165 of the core 130.

The flux path 163 of the magnetic component 160 is also oriented by means of a pair of thin, flat, flexible bucking magnets 166 and 167 that are facially polarized and secured at the outer cylindrical surface 168 of the mold component 120. These magnets are arranged with respect to the pole faces of the center core in a manner like that described in the previous embodiment so that the surfaces 169 and 170 of the annular member 120 which confronts the arcuate pole faces 161 and 162 across the cavity area have an induced polarity like that of the confronted pole face.

The embodiment shown in FIGS. 12–14 may be used for casting a stator having a matrix formed from either solid thermoplastic or liquid thermosetting polymeric material and the following procedures may be employed in the preparation of a cosmetically attractive and fibrous reinforced stator component.

In utilizing the apparatus depicted in FIGS. 12–14 for forming a stator having a matrix of hardened thermoplastic material, the mold 112 is initially driven at a suitable angular velocity and the components that go into the formation of the stator are separately delivered to the cavity area by way of the feed mechanism 117. In a typical process, rotation of the mold 112 about the axis 116 will create a reduced pressure condition in the cavity area. As the mold rotates under circumstances where the cavity is empty, air in passageways 143 is displaced radially due to the centrifugal action transpiring and this creates a reduced pressure condition in the annular recess 142 and because of the orifice connection 144 with the cavity area also creates a reduced pressure condition in the cavity 118. As a result, there is a continuous flow of air from the hopper 157 through conduits 156 and 148 to the receiving chamber 132 and thence through passageways 133 to the cavity 118. Accordingly, when material is placed in the hopper 157 it is sucked into the cavity area 118 for reasons of the existing reduced pressure conditions. In a typical procedure, a predetermined amount of commutated, pulverulent solid thermoplastic polymeric material may be added to the hopper 157. For reasons of the reduced pressure conditions in the cavity area, this added material will be drawn through conduits 156 and 148 into the receiving chamber 132 and from this chamber 132 the material will be drawn through passageways 183 into the cavity area 118. Some of the pulverulent material may become entrained and drawn via passageway 148 into annular recess 142 and from whence it will be centrifugally delivered to the exterior of the mold area through passageways 143. However, most of the solid particles will orient themselves under the centrifugal action transpiring in the cavity area radially outwardly from the outlet passage 144 toward the inner surface 128 of the annular mold member 120. Here by the transmission of heat from the radiant heaters 119 the material is heated to the point at which it becomes fluid and deformable. When this happens a suitable pulverulent nonmagnetic material may be added to the hopper in order to form an annular stratum in the finished product which provides the desired external appearance. This material, such as calcium carbonate, may be added alone to the hopper 157 or together with suitably short lengths of fibrous reinforcement such as glass fibers and will be drawn by the reduced pressure conditions into the cavity area and where it will become entrained in the fluid plastic material and by centrifugal force, caused to migrate toward the cylindrical surface 128 of member 120. To provide an annular stratum of yoke forming material contiguous to the pigmented calcium carbonate bearing stratum, a predetermined amount of particulate ferromagnetic material may now be added to the hopper 157 and from whence the particles are drawn by the reduced pressure conditions through conduits 156 and 148 into the receiving chamber 132. From here the particles pass via passageways 133 to the cavity area. These particles then become entrained in the deformable mass of synthetic plastic material and under the centrifugal action transpiring migrate radially to compact into a cylindrical stratum contiguous to that containing the calcium carbonate. The amount of time, of course, which will be required for the materials to migrate to their proper regions and form a compact mass can be determined in each instance empirically by trial and error procedures, and the time, of course, will vary in accord with the density of the particulate material and centrifugal forces which are involved. Following the addition of the ferromagnetic particles to the hopper and after sufficient time has been allotted to permit the particles to compact into the desired region, a predetermined amount of the sensitized particulate magnetically anisotropic material may be added to the hopper 157 and from whence it will be delivered to the cavity area 118. Here the particles will be simultaneously oriented in the deformable plastic material by the centrifugal action transpiring and by the flux field from the core magnet. The amount of polymeric material initially added is preferably slightly in excess of the volume which will be occupied by the matrix material in the cast stator. Accordingly, one can readily determine by examination of the discharge from passageways 143 when sufficient particles of anisotropic material have been added to form a compacted mass providing the desired regions adjacent the magnetic core component of the mold.

When the particulate material has been all added to the cavity area, heating of the mold may be discontinued so that the thermoplastic material hardens as the mold contents cool to ambient temperatures. The rotation of the mold, of course, is continued until the matrix hardens sufficiently to maintain the orientation and particle compactness in the various stratum and regions. Thereafter the cast stator may be removed from the mold and the anisotropic material may be further magnetized to magnetically saturate the particles to a suitable remanence value.

When the particulate materials used in forming the various regions or strata have different densities that permit their separation by centrifugal action, the materials may be mixed together and simultaneously added to the hopper for passage to the cavity area. However, the preferred practice is to add each type of particulate material separately with the material contemplated for formation of the outermost stratum being added first and the anisotropic material last since this practice avoids appreciable comingling of particles in the adjacent stratum.

Figure 15:
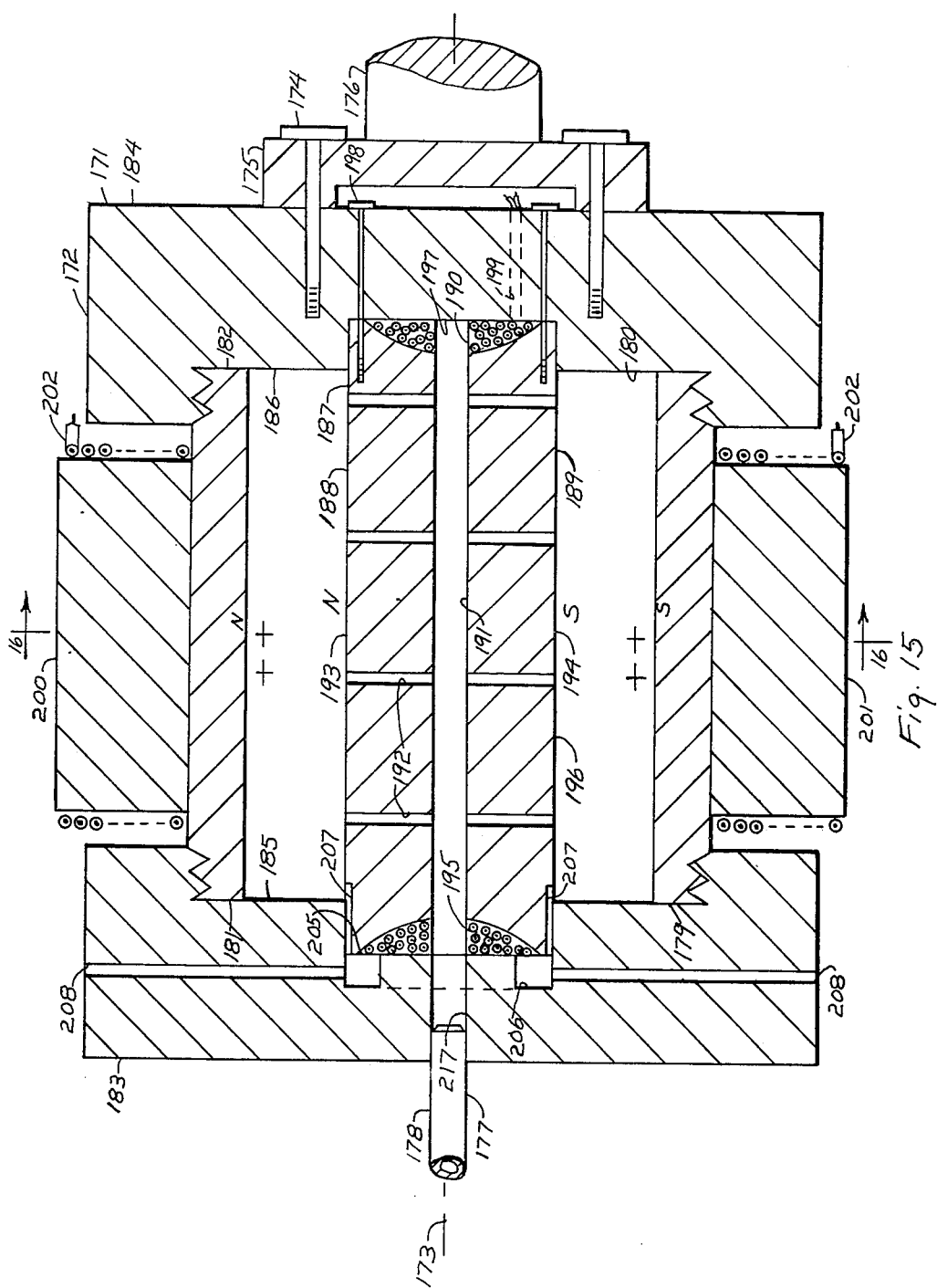
FIG. 15 is a sectional view through yet another embodiment of an apparatus used for centrifugally casting the stator structures and which is taken along a plane common to the axis of rotation of the mold structure, certain parts being broken away and others omitted to facilitate a better understanding of the arrangement.
Figure 16:
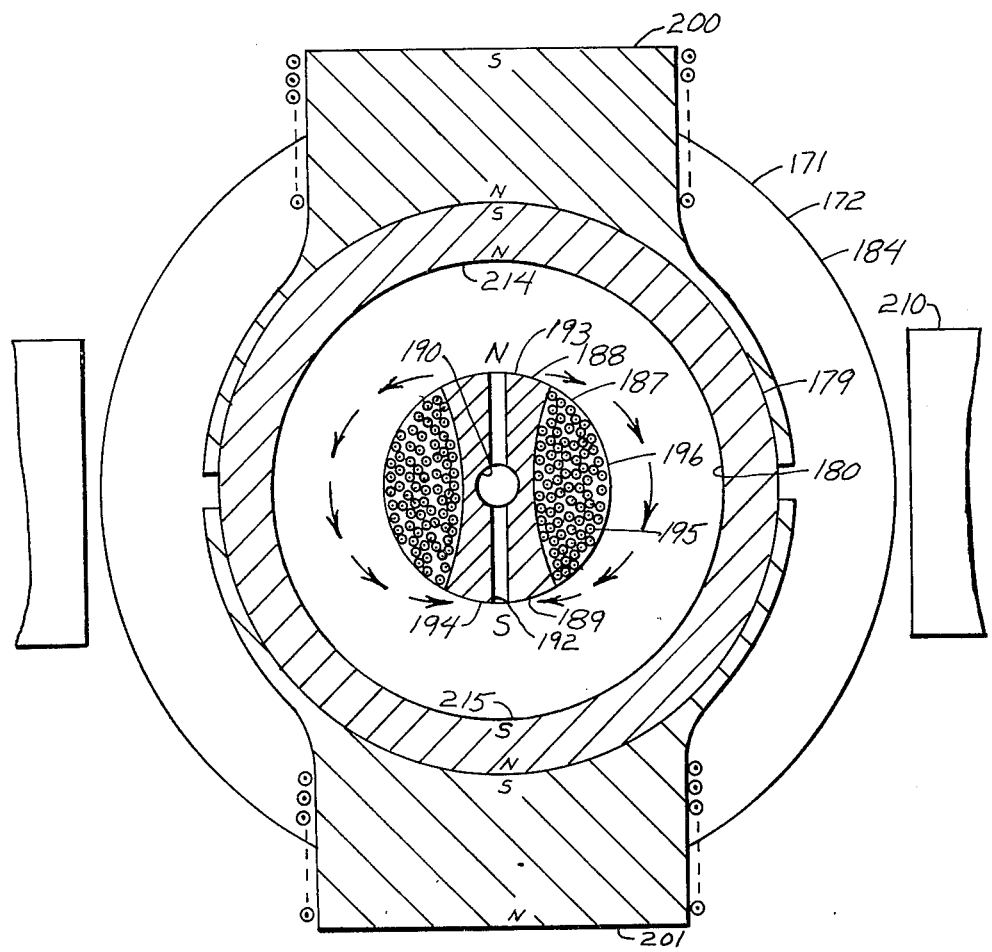
FIG. 16 is a sectional view through the mold seen in FIG. 15 as taken transverse to the axis of rotation along the lines 16—16 thereof.

Reference is now made of FIGS. 15 and 16 and wherein yet another apparatus 171 which may be used for centrifugally casting the stator structures is illustrated as including a mold 172. The mold is rotatable about its longitudinal axis 173 and is connected by metal fasteners 174 to the end flange 175 of a driven shaft 176. Shaft 176 serves as a means for rotating the mold about its axis. The apparatus 171 includes a feed mechanism 177 like that illustrated in FIG. 12, of which only the delivery conduit 178 is shown in the drawings.

The mold 172 is formed by an annular member 179 that defines the circumferential outer perimeter of the cavity area 180. The member 179 is also equipped at its opposite ends 181 and 182 with a pair of disk-type circular end caps 183 and 184. These caps, like the previous embodiment, have inner facial recesses 185 and 186 and are secured to the shell by means of an internal threaded connection evident from the drawings.

The elongated, axially arranged core component 187 in this instance has an electromagnet 188 as opposed to the permanent type magnetic core structure seen in the previous embodiments. The core magnet 188 has an elongated core piece 189, made of soft iron, and which, as seen in FIG. 16 in cross section, has an axially extending bore 190 which is coaxial with the axis of rotation for the mold structure and serves as the receiving chamber 191 for the materials fed to the mold 172 from the feed mechanism. This core piece for the magnet also has radially extending passageways 192 which in this instance interconnect the cavity area in the chamber through the arcuate pole faces 193 and 194 established by the core piece. As also seen in FIG. 16, the thickness of the core piece, in cross section, progressively increases radially outwardly from the bore 190 forming the receiving chamber and the windings 195 of the electromagnet are encased in hardened plastic material to provide a continuous cylindrical surface 196 at the inner periphery of the cavity area 180. Cap 184 has a center recess 197 and here the electromagnet is secured to the cap by metal screw fasteners 198. Cap 184 also has a bore 199 which communicates with the exterior of the cap and with a recess 197 which the end of the core is received. Bore 199 accommodates the leads for the core magnet and which are electrically connected to a pair of slip rings (not shown) but which are fixed to the shaft 176 and electrically connected by suitable brushes (not shown) to a DC power source. The annular member 179 in this instance, is also equipped with a pair of electromagnets designated at 200 and 201. These electromagnets are connected in series and have a pair of leads 202 which are electrically connected to another pair of slip rings (not shown) that are fixed to the shaft 176 and via suitable brushes (not shown) to a DC source.

The other end of the core magnet 188 fits in a suitable circular recess 205 in the end cap 183. This recess 205 is coaxial with recess 197 and has an annular recess 206 which is connected with the cavity area by means of peripheral end slots 207 in the pole faces 193 and 194 at this end of the core component of the mold. The annular recess 206 communicates with the exterior of the mold by means of radially extending passageways 208 similar to the arrangement shown in the previously described embodiments.

The apparatus shown in FIGS. 15 and 16 may be used for casting a stator having a matrix of either thermoplastic or thermosetting material and to provide the heating function the apparatus includes a pair of induction heaters 210 that are radially offset from the mold and rotatable structure.

In utilizing the apparatus shown in FIGS. 15 and 16, the mold 172 is assembled and initially subjected to rotation about its axis 173 of revolution at a suitable angular velocity. This causes a vacuum condition to be created in the cavity area 180 as previously described. Thereafter a predetermined amount of liquid thermosetting synthetic resinous material is introduced to the cavity area 180 via the feed mechanism 172 that communicates through the end cap bore with the receiving chamber 191. The fluid material, of course, passes via passageways 192 to the cavity area from the receiving chamber. The amount of liquid resinous material added in this instance is preferably slightly in excess of the requirement for the matrix material of the stator structure so that again complete fullness of the cavity area can be detected by the expulsion of the excess contents through the radially extending passageways in end cap 183. Following introduction of the liquid resinous material, particulate ferromagnetic material may be introduced to the cavity area to form a peripheral stratum in the fluid resinous material previously incorporated therein. After the yoke forming ferromagnetic particles have suitably migrated and compacted at the outer perimeter of the cavity area, particulate anisotropic and presensitized ferrite material may be added via the feed mechanism and in amounts sufficient to displace the excess resin through the slots 207. The ferrite material under such circumstances will form an inner stratum in the fluid plastic material in the cavity area and at this point, the core magnet 188 can be energized to establish a particle orienting field for the sensitized ferrite material and which is generally represented by the arrows 212. Simultaneously, the electromagnetic "bucking" magnets 200 and 201 can be energized to further orient the external path of the flux field of the core magnet. As seen in FIG. 16, the energizing of the electromagnets 200 and 201 will provide induced polarities at the diametrically opposite inner faces 214 and 215 of the annular member and which are like those of the confronting pole faces 193 and 194 respectively. After the anisotropic material has become suitably compacted and magnetically oriented induction heaters 210 may be energized to elevate the temperature within the mold and accordingly, effectuate hardening of the thermosetting material therein.

Figure 18:
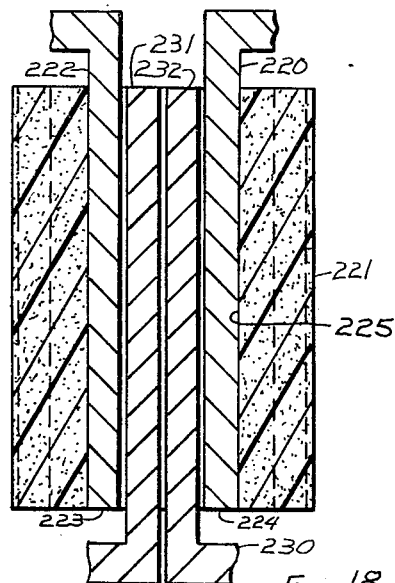
FIG. 18 is a vertical sectional view taken along the vertical axis of the arrangement seen in FIG. 17.
Figure 17:
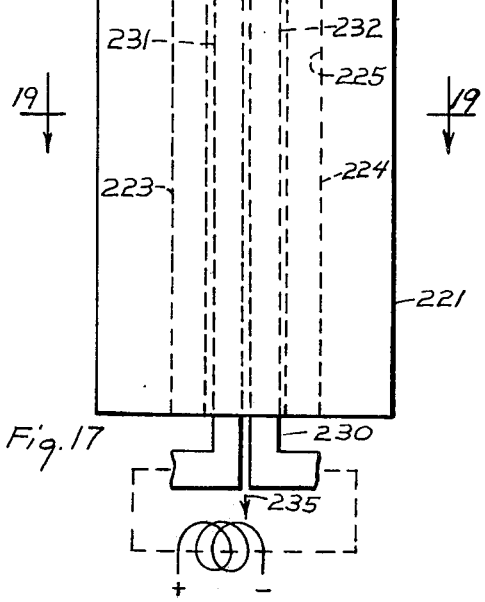
FIG. 17 is a side elevational view of a device for magnetically saturating the stator structure along the path of orientation of the plastic encased anisotropic particles.
Figure 19:
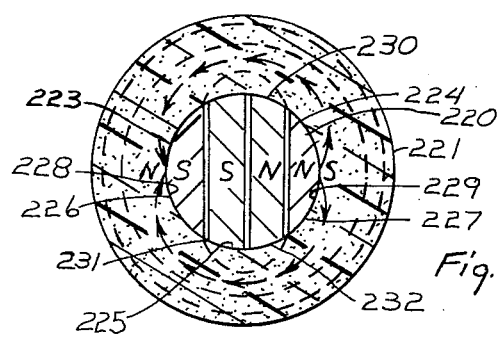
FIG. 19 is a transverse horizontal section taken along the lines 19—19 of FIG. 18.

Reference is now made to the magnetizer illustrated in FIGS. 17–19 and wherein the magnetizer 220 is seen as associated with a stator 221 during the process of magnetically saturating the ferrite particles thereof.

The magnetizer comprises a first electromagnet with a pair of elongated shoes 223 and 224 which extend during use of the magnetizer into the hollow 225 of the annular stator component 221. The stator 221 under such circumstances is oriented with respect to the pole faces 226 and 227 of the shoes so that they face the pole faces 228 and 229 of the stator having opposite polarities.

The magnetizer also includes a second electromagnet 230 which has a pair of elongated shoes 231 and 232 that also extend into the hollow 225. The shoes 223 and 224 of the electromagnet 222 are spaced apart at diametrically opposite sides of the hollow as seen in FIG. 19 and the shoes 232 and 231 of magnetizer 230 are located in the space between the shoes 223 and 224. Magnetizer 230 serves as a bucking magnet and shoes 231 and 232 are polarized during use so that their polarities are like those of the adjacent shoes 223 and 224 of electromagnet 222. As such, electromagnet 230 serves to resist a flux path between shoes 223 and 224 across the air gap through the hollow and causes the path to traverse that generally represented by the arrows 2 along the path of orientation of the ferrite particles. In the preferred practice, electromagnet 220 has a greater number of ampere turns than electromagnet 230. FIGS. 17–19 are merely illustrative of the magnetizer arrangement and provision may be made for withdrawing the shoes from the hollow as in the directions of arrows 235 to facilitate removal of the saturated stator from the magnetizer.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A stator for a dynamoelectric machine comprising a one piece annular member having an axis and a hollow extending along the axis for the reception of a rotatable member of the machine, said annular member having inner and outer peripheral surfaces which are radially offset from said axis and radially spaced apart, said annular member comprising magnetically anisotropic particles of magnetically attractable ferrite material which are embedded in a matrix of hardened synthetic plastic material, said particles being magnetically aligned and permanently magnetized along a return flux path that extends in the member between arcuate pole faces which are of opposite polarity and circumferentially spaced apart at the inner peripheral surface of the annular member, said annular member having an arcuate region of substantially uniform concentration of said particles in the matrix material and which extends along the flux path and is continuous between said pole faces, said region being located radially outwardly of the inner peripheral surface in the arcuate space between said pole faces, and said member having another region in the arcuate space between said pole faces and which is located between said arcuate region and the inner peripheral surface, such other region having a concentration of said particles which is less than the concentration thereof in said arcuate region.

2. A stator in accord with claim 1 which further comprises an annular member of ferromagnetic material having an axis which is arranged in coaxial relation to the axis of the one piece annular member, such annular member of ferromagnetic material having an inner peripheral surface which is contiguous with the outer peripheral surface of the one piece annular member.

3. A stator in accord with claim 1 where said matrix of the one piece annular member has an annular stratum of ferromagnetic particles embedded therein, said stratum being located contiguous to and radially outwardly of said arcuate region of uniform particulate concentration.

4. A stator in accord with claim 3 where said matrix of the one piece annular member has an annular stratum of nonmagnetic particles embedded therein, said stratum of nonmagnetic particles being located at said outer peripheral surface.

5. A stator for a dynamoelectric machine comprising a one piece annular member having an axis and a hollow extending along the axis for the reception of a rotatable member of the machine, said annular member having inner and outer peripheral surfaces which are radially spaced apart, said member comprising particulate materials which are embedded in a matrix of hardened synthetic plastic material and which include particles of ferromagnetic material and magnetically anisotropic particles of magnetically attractable material, said ferromagnetic particles being arranged in an annular stratum thereof, said magnetically anisotropic particles being magnetically aligned and permanently magnetized along a return flux path that extends in the member between arcuate pole faces which are of opposite polarity and circumferentially spaced apart at the inner peripheral surface of the annular member, said member having an arcuate region of substantially uniform concentration of said anisotropic particles and which extends along the flux path and is continuous between said pole faces, said annular stratum being located radially outwardly of and contiguous to said arcuate region of magnetically anisotropic particles, said arcuate region being located radially outwardly of the inner peripheral surface in the arcuate space between said pole faces, and said member having another region in the arcuate space between said pole faces and which is located between said arcuate region and the inner peripheral surface, such other region having a concentration of said anisotropic particles which is less than the concentration thereof in said arcuate region.

6. A stator in accord with claim 5 where the regions containing anisotropic particles were formed by centrifugal casting procedures and where the anisotropic particles were magnetically oriented while rotating about said axis.

* * * * *